March 19, 1968    B. EDWARDS ET AL    3,374,133
METHOD OF MAKING AIR-PERVIOUS THERMOPLASTIC-OVERLAID FABRIC
Filed Oct. 10, 1963    3 Sheets-Sheet 1
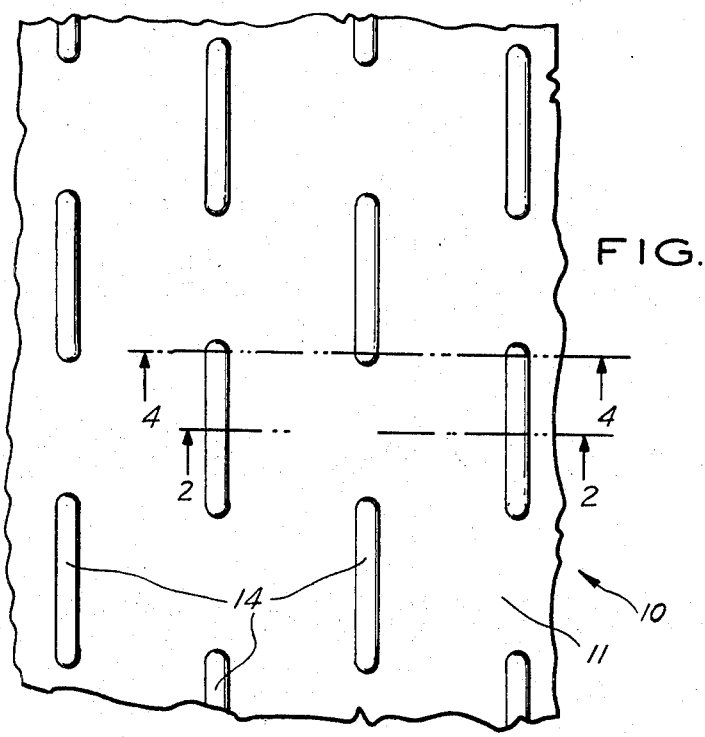
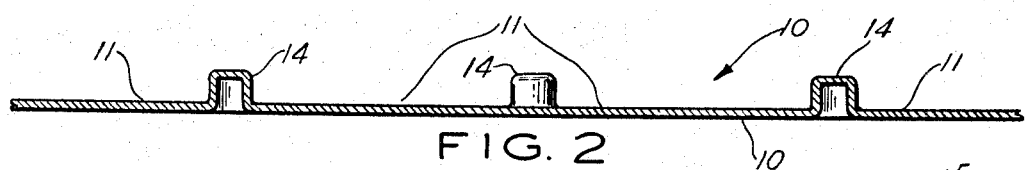
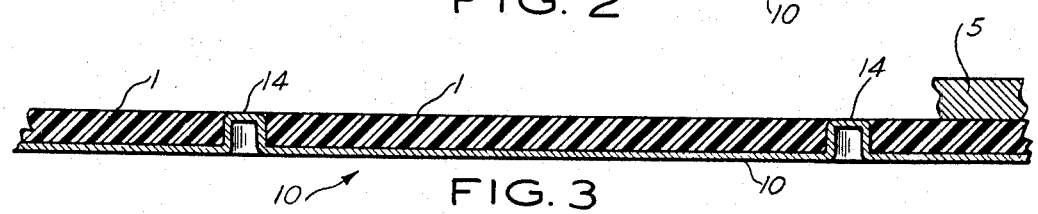
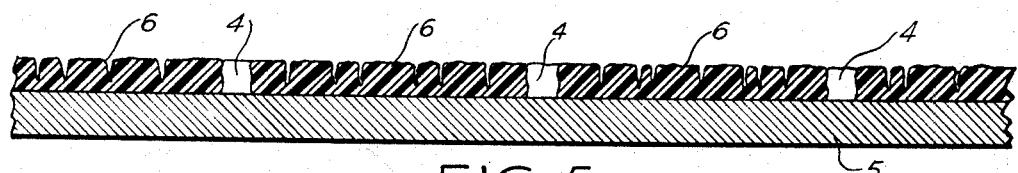
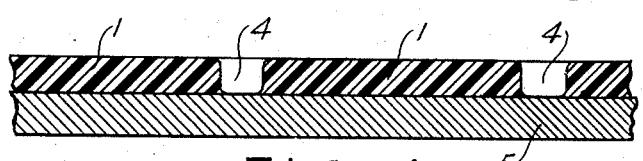
INVENTORS
BERNARD EDWARDS
THEODORE KIMAK
BY
AGENT

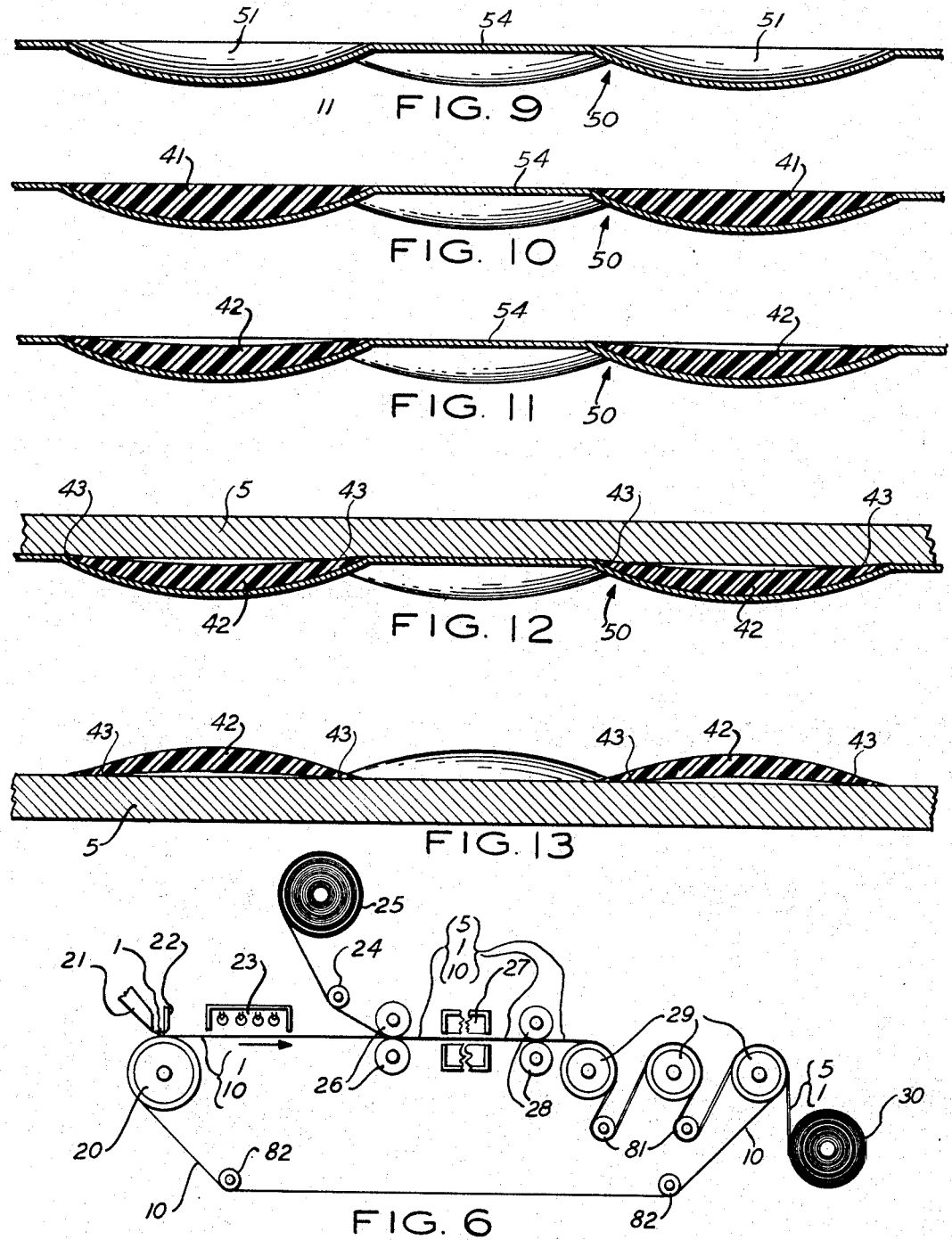

March 19, 1968     B. EDWARDS ET AL     3,374,133
METHOD OF MAKING AIR-PERVIOUS THERMOPLASTIC-OVERLAID FABRIC
Filed Oct. 10, 1963     3 Sheets-Sheet 3
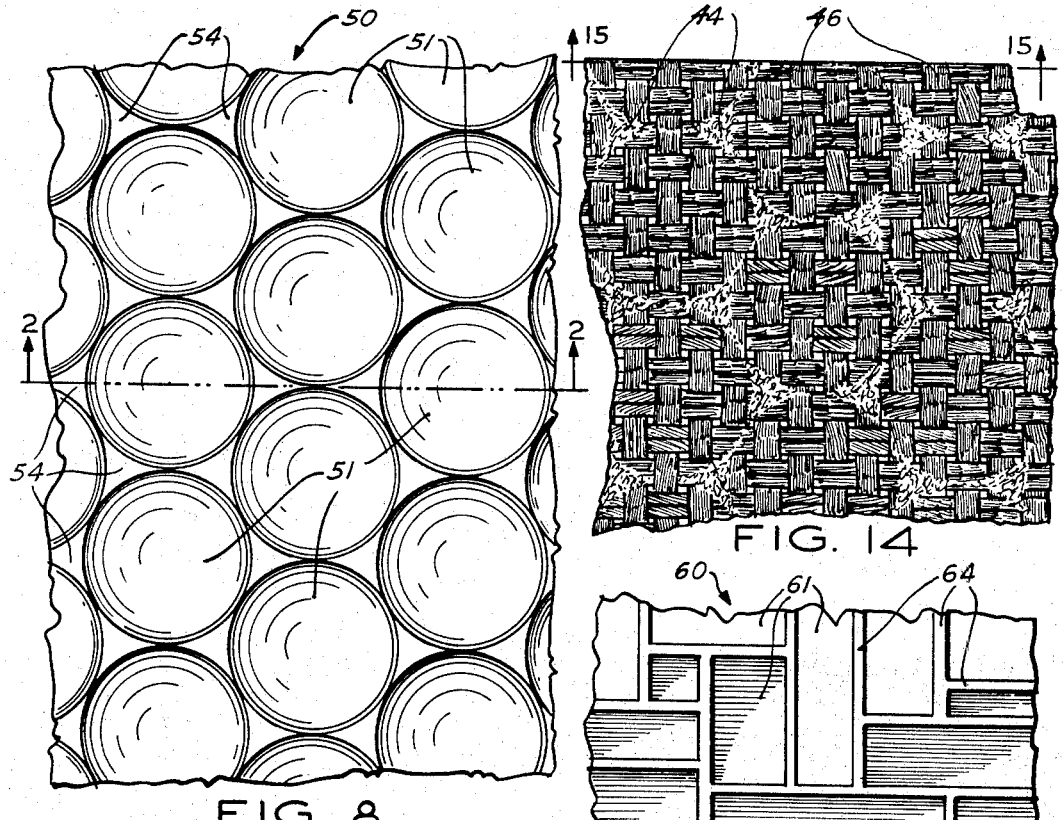
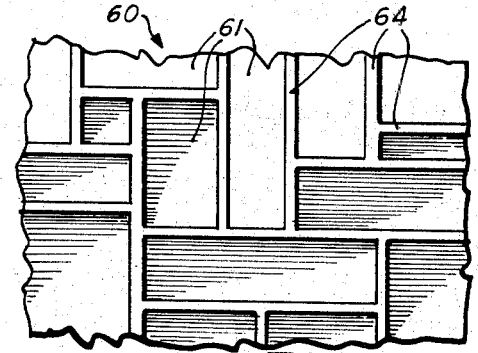
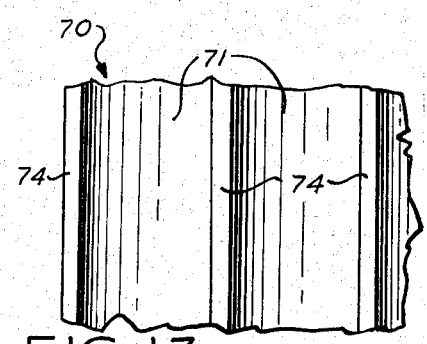
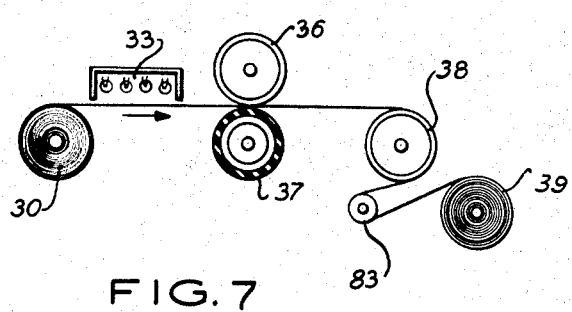
INVENTORS
BERNARD EDWARDS
THEODORE KIMAK
BY Edmund W. Bopp
AGENT

3,374,133
METHOD OF MAKING AIR-PERVIOUS THERMOPLASTIC-OVERLAID FABRIC
Bernard Edwards, Cranford, and Theodore Kimak, Clifton, N.J., assignors to Air Reduction Company, Incorporated, New York, N.Y., a corporation of New York
Filed Oct. 10, 1963, Ser. No. 315,293
12 Claims. (Cl. 156—220)

This invention relates to method of making air-pervious thermoplastic-overlaid fabric.

The invention has especial reference to a fabric, itself air-pervious, carrying on one of its surfaces an adherent overlay of flexible thermoplastic material which, if it were really continuous, would render the product air-impervious, but which is interspersed by limited interstices; at these interstices the fabric, although its strands or other elements may even there be lightly coated with a vinyl or other moisture-proof substance, remains air-pervious and accordingly so does the product. The overlaid fabric may be printed with a solid color or with a combination of colors in any desired design, and a grain may be embossed in the overlay. Such fabrics, broadly known, afford ready cleanability, durability and similar practical advantages together with the aesthetic advantage of highly attractive appearance, yet without entailing the temperature and humidity discomforts inherent in air-impervious products; they find wide acceptance for incorporation in a variety of articles, importantly including articles wherein the fabric will be close to portions of a person's body— such as chairs or seats (including those in automobiles and boats), in which these fabrics are used for upholstery, or as shoes, in which these fabrics are used for uppers, and the like.

It is known in the manufacture of such thermoplastic-overlaid fabrics to apply the interstitially interspersed overlay of thermoplastic material to the fabric in fluid form and to accomplish the solidification of that material wholly after it is thus in place; such application, for example, is in some cases performed by the use of a stencil, and in other cases by the use of a serrated knife. With the latter of these typical procedures the overlay is restricted to the form of parallel bands, while with either it is required to take the form of discrete segments of some shape; these are limitations which, while sometimes wholly unobjectionable, are nevertheless unduly restrictive; they foreclose the arrangement of the interstices as separated discrete ones, which is often desirable for aesthetic reasons and which is technically desirable when a maximum ratio of overlaid area to total area is of importance. From another point of view the application of the interstitially interspersed overlay to the fabric in fluid form renders it very difficult to achieve more than a modest thickness of overlay, which is insufficient for many use requirements, unless there be tolerated interstices which at least at the exposed surface of the overlay occupy a substantial fraction of the total surface area.

We have found that the foregoing shortcomings may be wholly obviated and various other advantages both as to process and as to product achieved as well by, and in a broad aspect the invention contemplates, the procedure of applying the interstitially interspersed overlay to the fabric in a previously formed and typically partially solid state.

According to more specific aspects of the invention the thermoplastic overlay is formed by casting in the relatively shallow hollow of a large-area mold, that hollow being interspersed by interstices (or absences of hollow nature) arranged just as the interstices in the overlay are to be arranged. The casting may comprise spreading the fluid thermoplastic material onto the mold and wiping away the excess of the material over approximately that which fills the hollow of the mold; it may further comprise the partial solidification of the material in that hollow. The fabric, to which there may when desired have already been applied an air-pervious anchor coating of a substance to which the cast overlay material is more readily adherent than to the fabric itself, is pressed against the mold with the cast material, still in the mold, in an adhesive condition, to effect the mutual adhesion of the cast material and the fabric. If it be desired to arrange for a continuous or semi-continuous operation the mold may be in the form of a belt and the pressing may be accomplished by rolling pressure. Subsequently, and preferably after the curing of the overlay material at relatively high temperature followed by a partial cooling of that material, a separation is effected between the mold on the one hand and the fabric overlaid by the interstitially interspersed cast material on the other.

Whether the interstitially interspersed overlay be formed and applied in the specific manner just outlined, or otherwise first formed and then applied, a desired grain (if any) may now be embossed in the overlay material—previously to which the overlaid fabric may if desired have been printed with any color or colors. The embossing step may comprise the heating of the overlay material to an almost-molten state and the formation of the desired grain by the pressure of a suitably cavitied roller or other surface against that material while hot; if the interstitial pattern in the overlay (corresponding to that of the mold) and the design of the graining have been suitably chosen for the purpose, this step serves largely if not essentially completely to attenuate the discernibility of that pattern, and the resulting overlay surface appears essentially as though the graining design had been applied uninterruptedly thereacross.

The interstices in the overlay, although necessarily subtracting from the actually overlaid area, need not break the continuity of the overlay; alternatively they may separate the overlay into a plurality of discrete segments. In the latter case the mold hollow will comprise a plurality of discrete depressions, and certain optional features of the invention become available. According to one of these features each of the mold depressions may be of cross-sectionally inwardly rounded form, with the result that each of the overlay segments will be initially of cross-sectionally outwardly rounded form; the subsequent embossing step may convert that form to a flat one, with certain potential advantages hereinafter mentioned.

According to another optional feature of the invention the many segments of the previously formed overlay may be applied to the fabric with those segments initially adhering to the fabric only at their marginal portions; for this purpose the overlay material may have been cast in the mold with the exposed surface of that material in each mold depression slightly concave. In this case the embossing step may effect the mutual adhesion of the non-marginal portions of the segments and the fabric, again with potential advantages hereinafter set forth.

In another of its aspects the invention comprises products each of which may have other utilities, but whose especial presently contemplated utility is as an intermediate product in some of the procedures above outlined. One of those intermediate products comprises the air-pervious fabric itself and thereon an adherent overlay of thermoplastic material in the form of interstitially separated segments of the outwardly rounded cross section above described. Another comprises the fabric with the overlay in the form of interstitially separated segments which at their marginal portions are adherent to, and therebetween are non-adherent to and preferably slightly arched from, the fabric.

In still another aspect the invention includes that end product which comprises the air-pervious fabric itself and thereon an adherent overlay of thermoplastic material in the form of discrete segments each substantially tangent to a plurality of others but having therebetween interstices at which the fabric remains air-pervious. The discrete segments may be substantially circular, and the interstices multi-cuspate; the segments may for example be arranged in a generally hexagonal pattern.

According to a particular aspect of the invention the mold may be formed from smooth vinyl-release paper, by the steps of applying a limited dosage of penetrant moisture to the surface of the paper opposite to its releasing surface thereby controlledly to moisten the paper, creating in the thus-moistened paper a deformation which is an interstitially interspersed hollow in its releasing surface, and drying the thus-deformed paper. The controlled dosing of the previously manufactured paper with the penetrant moisture enables much deeper deformations of the paper to be achieved without rupture; the penetrant moisture may be applied in vaporous form, for example in the form either of steam or of a mist (such as of water and air).

The application of the interstitially interspersed overlay to the fabric in previously formed condition, and the use of casting for that formation, permit without complication as great a thickness of overlay as may be desired, as well as any arrangement of interstices including separated discrete ones; they also contribute importantly to the ability to effect sharp and, where desired, deep graining by a subsequent embossing step (an ability still further contributed to by the optional features mentioned above, for reasons set forth in the detailed description). More broadly, the procedures according to the invention present general advantages of simplicity, adaptability to continuous or semi-continuous operation, ease of control, permanence of adhesion of the overlay and durability of the end product.

Various objects of the invention have been made apparent in the foregoing brief description thereof. Allied and other objects will appear from the following detailed description and the appended claims.

In the detailed description reference is had to the accompanying drawings, in which:

FIGURE 1 is a greatly enlarged fractional plan view of the surface of a typical mold in which the thermoplastic material may first be cast;

FIGURE 2 is a further enlarged cross-sectional view taken along the plane indicated by the line 2—2 in FIGURE 1;

FIGURE 3 is a view similar to FIGURE 2 but showing the mold hollow filled with the thermoplastic material, and in its extreme righthand portion fractionally showing the fabric pressed against the mold;

FIGURE 4 is a cross-sectional view through the fabric overlaid by the cast material immediately after their separation from the mold (line 4—4 of FIGURE 1 indicating the mold cross-sectional plane corresponding to the plane of FIGURE 4);

FIGURE 5 is a cross-sectional view similar to FIGURE 4 but showing the product after embossing;

FIGURE 6 is a wholly schematic view of a typical apparatus by which the intermediate product of FIGURE 4 may be made;

FIGURE 7 is a wholly schematic view of a typical further apparatus by which the overlay of the intermediate product may be embossed;

FIGURES 8 and 9 are views respectively corresponding to FIGURES 1 and 2 but showing a materially different mold;

FIGURE 10 is a view similar to FIGURE 9 but showing the depressions which form the hollow of the FIGURE 8-9 mold just filled with thermoplastic material;

FIGURE 11 is a view similar to FIGURE 10 but showing the mold depressions filled in their marginal portions and almost filled in their non-marginal portions;

FIGURE 12 is a view similar to FIGURE 11 but showing a fabric pressed against the surface of the mold and adhering to the marginal portions only of the segments of material in the respective depressions;

FIGURE 13 is a view, corresponding to FIGURE 4, through the fabric overlaid by the cast material immediately after their removal from the mold of FIGURES 8-9;

FIGURE 14 is a typical plan view, of the same scale as FIGURE 8, of the product of the FIGURE 8-9 mold after embossing;

FIGURE 15 is a cross-sectional view, of the same scale as FIGURES 9 through 13, taken along the line 15—15 of FIGURE 14;

FIGURE 16 is a view similar to FIGURE 1 or 8 but illustrating an alternative plan of mold; and FIGURE 17 is another view similar to FIGURE 1 or 8 but illustrating a further alternative plan of mold.

While it has been made apparent in the above brief description that other methods of application of the interstitially interspersed and previously formed overlay may be employed the detailed description describes the preferred casting procedure. In accordance with that procedure there is employed a mold in whose exposed surface there is a shallow interstitially interspersed hollow—i.e. a hollow shallow relative to the mold area and interspersed by, or provided at intervals with, interstices or limited areas of opposite (e.g. unhollowed) character. FIGURES 1 and 2 fractionally illustrate such a mold. In an inexpensive form which we have very satisfactorily employed, the mold, designated as 10, is formed of smooth vinyl-release paper—a paper which on one of its two surfaces is suitably coated so as to facilitate the separation from that surface of vinyl or other thermoplastic material previously applied thereto, and which is itself well known in the art (examples being S. D. Warren and Co. "Transcote ER" and "Stripcote ER"). The hollow, designated as 11, is formed in the releasing surface of that paper; it is interspersed with the interstices 14, where the mold is unhollowed, which in the particular example illustrated in FIGURES 1 and 2 are in the form of narrow "bars" arranged parallel with each other in a staggered pattern and occupying about 10% of the area occupied by the hollow proper.

In order to deform the initially flat vinyl-release paper in a manner which will facilitate the desired depth of hollow, but without rupture of the paper and with the assurance of strength and permanence, we have found it desirable first to apply to the rear surface of the paper (i.e. the surface opposite to the releasing surface) a limited dosage of penetrant moisture and thus controlledly to moisten the paper; the hollow may then be formed by a suitable embossing means, on either the rear surface or the releasing surface of the paper, such for example as a female embossing roller onto which the rear surface or the releasing surface of the paper is forced by a cooperating soft-rubber-surfaced roller pressing against the paper's opposite surface, and the paper thereupon dried. We have satisfactorily applied the penetrant moisture in vaporous form, either as steam or as a room-temperature mist of water and air.

Into the mold hollow there may be cast the thermoplastic material. This may for example be a plastisol of such a typical composition as the following:

| | Parts |
|---|---|
| Polyvinyl-chloride resin | 100 |
| Finely ground calcium carbonate | 20 |
| Di-2 ethyl hexyl phthalate | 60 |
| Epoxidized soybean oil | 5 |
| Di-octyl adipate | 15 |
| Cadmium-barium-type stabilizer | 2 |

(Some commercial examples of the first-listed ingredients are Goodrich "Geon 121," Firestone "Exon 654" and U.S. Rubber "V.R. 50" or "V.R. 53"; a commercial example of the second-listed ingredient is Thompson-Weinman "Atomite.")

The thermoplastic material, at this stage typically in the form of a heavy liquid, may be flowed or otherwise spread at room temperature onto the mold 10 and the mold passed under a suitable "knife" (or the knife passed over the mold) to remove the excess of the material over approximately that which fills the hollow 11. A typical resulting filled mold is shown in cross section in FIGURE 3, wherein the thermoplastic material is designated as 1. The mold may then be passed under a bank of infra-red lamps (with the material 1 facing the lamps) or otherwise processed to result in the formation of the material 1 into a partially solid or partially "gelled" state.

There may be a tendency for a thin film (not illustrated) of the thermoplastic material to be left by the knife on the mold surface at the interstices 14; we have found that such a film at the interstices is not necessarily disadvantageous. Apparently either this film in the later processing (e.g. in the passage through the oven 27, hereinafter mentioned and/or in the heating, as by lamps 33 hereinafter mentioned, incident to embossing) is retracted under the influence of surface tension into the relatively thick material in the hollow 11, or it is sufficiently dispersed over the strands or other elements of the fabric so that air-perviousness at the insterstices is not interfered with, or each of these effects takes place in partial degree. It will accordingly be understood that we do not, unless expressly, disclaim the leaving by the knife of such a film at the interstices.

Upon emergence from the infra-red lamp or equivalent processing the material 1, which may now be considered a pre-formed interstitially interspersed layer, is by reason of its elevated temperature in an adhesive condition. While it remains in that condition (or if that processing it has been allowed to cool, then after its appropriate restoration to adhesive condition) there may be pressed against the exposed surface of the mold an air-pervious fabric 5, to effect the mutual adhesion of that fabric and the material 1; the fabric while thus pressed against the mold is fractionally illustrated in cross section in the very righthand portion of FIGURE 3.

The fabric 5 itself may be any air-pervious fabric—a woven or knitted one, or a non-woven web, or a fabric otherwise formed—examples including drills, sateens, broken twills, sheetings or knit goods. The fabric's elemental material may be cotton, or rayon or nylon or other synthetic fibre, wool or other material or combinations of any of the foregoing. For certain purposes the fabric might even be a suitable air-pervious paper.

Prior to the pressing of the fabric 5 against the mold, it is desirable, though not in all instances indispensable, to apply to that surface of the fabric which will be disposed toward the mold an anchor coating of a substance to which the cast material is more readily adherent than to the fabric proper—this coating being essentially a coating of the individual elemental portions of the fabric at and adjacent that surface and not itself a continuous overlay, in order that it shall not interfere with air-perviousness—and fully to dry that coating before the pressing of the fabric against the mold. A suitable substance for the anchor coating is for example a polyvinyl-chloride dispersion; a composition which we have very satifactorily used for such coating is:

|  | Parts |
|---|---|
| Vinyl chloride-vinyl acetate copolymer dispersion resin | 160 |
| Calcium carbonate | 40 |
| Di-2 ethyl hexyl phthalate | 80 |
| Tri-cresyl phosphate | 14 |
| Xylol | 70 |
| Aliphatic hydrocarbon | 70 |
| Cadmium-barium-type stabilizer (coprecipitated barium and cadmium salts of fatty acids) | 3 |

(A commercial example of the first-listed ingredient is Bakelite "VYNV"; a commercial example of the sixth-listed ingredient is Socony-Mobil "Solvasol No. 3.")

It may here be mentioned that in some cases the fabric 5 may in its original form have a multi-color design (for example formed in its weaving, or already printed on it) whose visibility is desired to be retained in the overlaid product, in which cases any anchor coating would desirably be a clear or nearly-clear one; further in those cases, as well as in the case wherein a design is color printed on the fabric as a next step after anchor-coating, the thermoplastic overlay material 1 may be a clear or nearly-clear one. According to an essentially contrary alternative, the whole matter of coloration may be deferred to a later stage. In more typical cases, however, the material 1 and the anchor coating may each be of a solid color (achieved for example by the use of ground light-fast pigments in the plasticizers of those materials), and that color may for example be the same for both.

After the fabric 5 is pressed against the mold to effect the mutual adhesion of the fabric and the cast material 1, the "sandwich" of mold, cast material and fabric may be subjected to passage through an air-circulating oven maintained at an elevated temperature (typically 300° F. to 450° F.) within which it preferably will remain for a time sufficient so that the material 1 will be fully cured. The "sandwich" may then be at least partially cooled; thereupon a separation may be effected by the mold on the one hand and the fabric overlaid by the interstitially interspersed cast material on the other. While still hot from its passage through the oven and before the cooling just mentioned, the "sandwich" may optionally be subjected to some pressure for the purpose of perfecting the adhesion of the material 1 to the fabric 5 to a greater extent than is necessarily inherent in the initial formation of the "sandwich"; this in general is preferred if the "sandwich" is to be subjected to appreciable handling before the embossing operation hereinafter described.

FIGURE 4 cross-sectionally illustrates the overlaid fabric at this stage. Obviously now the air-pervious fabric 5 has an adherent overlay which is interstitially interspersed, by interstices (designated as 4) arranged in a pattern corresponding to (i.e. constituting the mirror-image of) the pattern of the interstitial interspersions 14 in the hollow 11 of the mold 10.

FIGURE 6 schematically illustrates a typical apparatus by which they may be carried out in a continuous or semi-continuous manner the process of making the overlaid fabric as thus far described. The mold 10 (of course having therein the interstitially interspersed hollow) may be in the form of a continuous belt, either of the vinyl-release paper already described or of thin metal or some other suitable material. At the left-shown or "input" end of the apparatus the mold 10 may pass around and over a large roller 20 at the top of which the thermoplastic material 1 may be fed onto the exposed surface of the mold, for example by chute 21, at a suitable rate. The knife, already referred to, appears as 22, positioned at about the high point of the roller 20. From that roller the mold 10 may pass under the bank 23 of infra-red lamps, and then between a pair of pressure rollers 26. From a bolt or other suitable supply 25 the fabric 5 (already carrying any anchor coating which is to be employed) may be fed around an idler roller 24 to pass, on top of the mold 10, between the same rollers 26, so that the above-described pressing of the fabric against the mold is accomplished by rolling pressure.

From the rollers 26 the "sandwich" of mold, material and fabric may pass through the air-circulating oven 27 and then, if it is to be subjected to some pressure at this stage in accordance with the third preceding paragraph, between suitable pressure rollers 28. Thereupon it may be passed, with the aid of suitably positioned idler rollers 81, around fluid-cooled rollers 29 with the mold side of the "sandwich" in contact with those cooled rollers. After passage of the "sandwich" around the last of the cooled rollers the overlaid fabric may be rolled up in a roll 30, while the mold 10, from which the "sandwich" has now been separated, may be returned around suitable further idler rollers 82 to the roller 20 first mentioned.

The product at this stage may be color-printed if it is not already of a desired color or if a design is to be but has not yet been imparted to it by printing; even in such cases this is not uniquely necessary, however, as still further opportunity typically exists for coloration.

The product, which at this stage has not been embossed with any grain, is still typically an intermediate one; it may, however, in suitable cases be used as a final product. In general such cases will be those in which no graining is desired (over and above such graining-like effect as may have been imparted to the material 1 by the interstices 4), and in which there has been no postponement (of such a nature as hereinafter described) of some above-described function to the time of later embossing.

In the more typical cases wherein the product at this stage is an intermediate one, the fundamental step in its processing to final form is the embossing of a desired grain in the overlay. This embossing step may basically comprise the heating of the overlay material, preferably to an almost-molten condition, and the forming of the grain in the heated material by pressure under a suitably cavitied roller or other surface. FIGURE 7 schematically illustrates a typical apparatus by which this embossing step may be carried out. From the roll 30 of intermediate product that product may be passed under a bank 33 of infra-red lamps, with the overlaid surface disposed toward the lamps, at a speed and with a lamp energization suitable to the proper heating of the overlay. It may forthwith be passed between an overlying embossing roller 36 in whose surface are cavities appropriate to the formation in the overlay of the desired grain and an underlying rubber-covered roller 37 relative to which the embossing roller exerts substantial pressure. From the rollers 36-37 the product—now, except for possible subsequent operations not forming parts of the present invention, the final one—may be passed over one or more fluid-cooled rollers 38 (with the aid of one or more idler rollers 83) and then rolled up in a roll 39. The embossing roller 36 may itself if desired be fluid-cooled.

FIGURE 5 cross-sectionally illustrates the overlaid fabric of FIGURE 4 after the embossing thereof with a wholly arbitrary grain. Relative to FIGURE 4, it illustrates a slight narrowing of the interstices 4; this, when the material 1 (as in the previous figures) is of thickness adjacent an interstice similar to its thickness in the mid-zone between interstices, is a typical incident of the pressure used in embossing. Interstices remain, however, and continue to perform their function of providing air-perviousness. The material 1 after graining has been designated as 6.

In the typical mold 10 above described in the interstices 14 are discrete "islands" which substract from the area, but do not break the continuity, of the hollow 11; correspondingly in the resulting overlaid fabric the interstices 4 are discrete voids which substract from the area, but do not break the continuity, of the overlay. Our invention alternatively contemplates a mold in which the interstices separate the hollow into a plurality of depressions, and a resulting overlaid fabric in which the interstices separate the overlay into a plurality of segments. In one arrangement the mold depressions and overlay segments are at points tangent each to a plurality of others; FIGURES 8 through 15 are pertinent to this arrangement, while FIGURES 16 and 17 respectively illustrate still other arrangements in which such tangency (of mold depressions and of resulting overlay segments) does not exist.

FIGURES 8 et seq. furthermore illustrate other optional features. One of these is (a) a cross-sectional inward rounding of the mold depressions, and a resulting outward rounding of the overlay segments, as initially formed; another is (b) the casting of the material in each mold depression with its exposed surface slightly concave, so that the pressing of the fabric against the mold surface intitially effects the mutual adhesion of the fabric and the segments at the marginal portions (as distinguished from the entire areas) of those segments. In the case of each of these optional features the conversion of the overlay segments to a final flat and fully adhered form is typically postponed to be performed as an incident of the embossing step. Either of these two optional features may be employed without the other.

In FIGURES 8 and 9 the depressions 51 which collectively make up the hollow of the mold are circular in plan; typically but non-limitatively each may be of the order of 0.2" in diameter. In accordance with the optional feature (a) each depression may be cross-sectionally inwardly rounded, for example as seen in all planes which pass through its center so that it takes the form of a small exterior portion of a sphere. Each depression may be tangent to a plurality of others, so that the interstices 54 between them are multi-cuspate in plan; with the depressions arranged in the preferred and illustrated hexagonal pattern, those interstices are of course tri-cuspate. While the mold 51 may be of any desired material, we have very satisfactorily formed it of vinyl-release paper by the use of the mold-forming techniques specially disclosed above. Into the several mold depressions 51 the thermoplastic material may be appropriately introduced, for example in manner similar to that disclosed above for the filling of the material 1 into the mold hollow 11; in this case that introduced material will of course take the form of a plurality of segments 41, one in each mold depression, as seen in FIGURE 10.

According to the optional feature (b) each of the segments, upon the completion of its casting and while still in the mold, may at its exposed surface be slightly concave. The slight concavity may result from a slight temporary downward yielding of the mold at the interstices 54 in the passage under the knife followed by prompt restoration to original form, or (if the knife be of less than wholly rigid material) from slight temporary local yieldings of the knife at those interstices, in either of which events the removal of material by the knife will actually have been a removal of the excess over that which fills the marginal portions and almost fills the non-marginal portions of the depressions; alternatively (or additionally) it may result from a slight volumetric shrinking of the material in the infra-red lamp or equivalent processing. More typically, and without reliance on any yielding or any material shrinkage, it may result from a tendency of the material, if sufficiently viscous and while not precluded from doing so by the high-level interstices, to "build up" (downwardly) to a slight degree on the knife edge and then to form in effect a slight temporary downward extension of the knife. It will however be understood that such slight concavity may readily be avoided by appropriate control of the conditions when the optional feature (b) is not desired.

FIGURE 11 illustrates the slightly concave segments, designated as 42, still in the mold, and FIGURE 12 illustrates the same but with the fabric 5 compressed (as by the rollers 26) against the exposed mold surface. The fabric under the influence of the pressure will tend to enter the concavity, but that entry will be partial only and as a result the initial adhesion will be only at the marginal portions 43 of the segments. Provided the pressure rollers 28 or their equivalent be omitted from the processing apparatus or be adjusted to limited pressure only, the intermediate product (for example as wound up in the roll 30) will have a cross-section such as illustrated in FIGURE 13, wherein each segment is at its marginal portions adherent and therebetween non-adherent to the fabric 5, being typically slightly arched from the fabric between those marginal portions.

In the case of an intermediate product characterized by either or both of the features (a) and (b) there will in the embossing step be inherently achieved (with respect to (a)) a flattening of the segments into approximate "pancake" from and (with respect to (b)) an effecting of the mutual adhesion of the non-marginal portions of the segments and the fabric, as well as any required "de-arching." By non-critical adjustment of the pressure of the embossing roller 36 the above mentioned "pancakes" to which the segments are inherently re-shaped in the embossing step may be made essentially to coincide in area with the outside areas of those segments; at the same time we have found that the outwardly rounded cross section tends to be advantageous for the initial segments, apparently because the marginward material displacement during embossing which it entails enhances the degree of the then-occurring "working" of the material and in turn results in a maximization of the degree to which the segment material will conform to the cavities in the embossing roller and will thus develop the desired grain. We have further observed that the limitation of the adhesion of the overlay segments in the intermediate product to the marginal portions of those segments tends to facilitate that "working," and also that the slightly arched relationship of those segments to the fabric, by predisposing the segments to some wrinkling as an incident of their de-arching, tends still further to contribute to the perfection of grain development.

FIGURE 14 illustrates in plan (subject to limitations inherent in the planar representation of effects actually three-dimensional) and FIGURE 15 in cross section a final condition of the overlay which insofar as grain is concerned is purely typical. It will be seen that the segments 42 have been effectively re-shaped into the form of grain-bearing "pancakes," now being designated as 46, adhering over the entireties of their bottom surfaces to the fabric 5. The particular grain shown in FIGURE 14 (and in the further enlarged FIGURE 15, which necessarily simply conforms to FIGURE 14) is wholly arbitrary, and it will be understood that any of an extremely wide variety of grains may be chosen from.

A characteristic to which it is quite impossible to do justice in two-dimensional illustration such as that of FIGURE 14 is the surprising absence, when (as in the illustrated case) intelligent choices have been made of the overlay patern and the graining design, of any significant impression of discontinuity of the grain at the interstices between the segments in the final product—in spite of the fact that these interstices actually still exist and that the fabric remains there air-pervious. Stating the matter in other terms, the embossing step has then largely, indeed, as a matter of impression except under the most purposeful examination, in effect wholly—attenuated the discernibility of any pattern in the overlay corresponding to the pattern of the mold depressions.

We have found that the shaping of the segments as circular, with each substantially tangent to a plurality of others—especially with an arrangement thereof in a generally hexagonal pattern, which maximizes their coverage of the fabric surface—is usually an apt one for the maximization, with discrete segments, of the effect dealt with in the preceding paragraph. At the same time we do not intend to limit the segments, unless expressly, to such shaping and arrangement; especially if there be made apt corresponding choices of grain, the shaping and arrangement of the segments may with still most satisfactory results be widely varied.

FIGURES 16 and 17 illustrate non-circular segmental shapes and non-hexagonal arrangements of the segments.

Thus FIGURE 16 shows a mold 60 in which the depressions, still separated by limited intervening interstices 64 and now themselves designated as 61, are in the form of approximate rectangles of random sizes and proportions and in random arrangement, each depression being for example cross-sectionally inwardly rounded as seen at least along a plane which in the figure would be vertical of the sheet. In turn FIGURE 17 shows a mold 70 in which the depressions, again separated by limited intervening interstices 74 and themselves designated as 71, are in the form of troughs, which, purely typically, are of uniform width, each being cross-sectionally inwardly rounded as seen along the plane transverse to the troughs. It will be understood that with the mold 60 of FIGURE 16 there will be produced segments which, although of different shape from those of earlier figures and of random sizes are still like those of FIGURES 8 through 15, of wafer form, while with the mold 70 of FIGURE 17 there will be produced segments which are of band form.

Whatever the form of the overlay (e.g. whether the interstices in it be discrete and separated, or discrete but tangent, or continuous) the final product according to the invention—typically that contained in the roll 39—may of course be subjected to further operations themselves well known in the art. Thus for example whether or not colors have previously been used in or printed on it during its manufacture, it may now be printed with any one or more colors, either solidly or in any desired design; furthermore a finish coating of a suitable substance, for example clear and of either bright, medium or dull finish as may be desired (though of suitable characteristics to avoid interference with the air-perviousness at the interstices) may be applied to it.

The thermoplastic material resulting from the above specific formula is of course a flexible vinyl, but no unexpressed limitation thereto is intended. Thus, it will be apparent from the foregoing description that the invention is in no way limited to any particular thermoplastic material and that it is applicable to any thermoplastic polymer composition which can be used to coat a fabric or paper sheet. Polyvinyl chloride and vinyl chloride-vinyl acetate copolymers are particularly advantageous thermoplastic film-forming materials for this purpose, but comparable results are obtained with other thermoplastic film-forming polymers and other copolymers such as the copolymer of vinyl chloride and vinylidene chloride. Similarly, the thermoplastic material may be compounded in any conventional manner to form a coating composition for application to a supporting fabric or web in accordance with techniques well known in the coated fabric art. The formulations which have been set forth above are, therefore, merely illustrative, both with respect to components and with respect to relative quantities, and the formulas of the coating compositions form no part of the present invention. Similarly, fillers other than calcium carbonate, plasticizers other than the phthalate, adipate, phosphate, and soy bean oil may be employed, and stabilizers other than the cadium-barium-type stabilizer, and other solvents may be readily employed. In like manner, any anchor coating material may be used to improve the adhesion of the applied thermoplastic material to the supporting web. Further, the thermoplastic material used in the above-noted specific formula is an unexpanded vinyl, but it will be understood that when desired it may be an expanded vinyl or other film-forming thermoplastic material; in this case the expanding agent, e.g. azodiformamide, present in the original plastisol in concentration appropriate to the desired degree of expansion, will ordinarily perform its expanding function during the passage of the "sandwich" through the oven 27. A detailed discussion of plastisols and the use of an expanding agent is found in Canadian Patent No. 664,322.

As will be apparent from the foregoing, the invention is not limited to specific thermoplastic coating materials or compositions, or to specific supporting fabrics, but is concerned with the manner of applying a thermoplastic coating composition to a supporting fabric to produce an air-pervious thermoplastic overlaid fabric having desirable characteristics.

In the drawings (especially in FIGURES 2 through 5) the depth of the mold hollow relative to other dimensions has in general been somewhat exaggerated, for the sake of clearest illustration, over that which may be most typical, though it still remains shallow relative to the mold area; other features and proportions in the drawings are likewise not in themselves to be taken as limitative. It will furthermore be understood that in the specification, except as the context may otherwise require, we have used various terms in their broader significances; thus for example by the term "pattern," except as limited expressly or by necessary implication, we refer simply to an arrangement of elemental areas, without any implication of repetitiveness; other examples will suggest themselves.

While we have disclosed our invention in terms of particular embodiments thereof and procedures it will be understood that we intend thereby no unnecessary limitations. Modifications in many respects will be suggested by our disclosure to those skilled in the art, and such modifications will not necessarily constitute departures from the spirit of the invention or from its scope, which we undertake to define in the following claims.

We claim:

1. In the manufacture of an air-pervious thermoplastic-overlaid fabric, the method which comprises the steps of (1) casting thermoplastic material in the interstitially interspersed shallow hollow of a large-area mold, (2) pressing an air-pervious fabric against the mold with the cast material in the mold in an adhesive condition to effect the mutual adhesion of the fabric and the cast material, said hollow of said mold comprising a plurality of depressions separated by intervening interstices, said casting step leaving the exposed surface of the cast material in each depression slightly concave and said pressing step effecting the mutual adhesion of the fabric and said segments at the marginal portions of those segments, whereby the fabric becomes overlain by a plurality of interstitially separated segments, (3) effecting a separation between the mold on the one hand and the fabric overlain by interstitially interspersed cast material on the other, and (4) embossing the overlay material and effecting the mutual adhesion of the non-marginal portions of the segments of that material, the presence of the unadhered non-marginal portions producing an enhanced embossing effect.

2. The subject matter claimed in claim 1 wherein said casting step comprises spreading the thermoplastic material onto the mold and wiping away the excess of the material over approximately that which fills the hollow of the mold.

3. The subject matter claimed in claim 1 wherein said casting step includes the partial solidification of the material in the hollow of the mold.

4. The subject matter claimed in claim 1 wherein prior to said pressing step there has been applied to said fabric an air-pervious anchor coating of a substance to which said cast material is more readily adherent than to said fabric itself.

5. The subject matter claimed in claim 1 wherein said mold is arranged as a belt and wherein said pressing step is accomplished by rolling pressure.

6. The subject matter claimed in claim 1 further including, between said pressing and separation-effecting steps, the step of curing the cast material.

7. The subject matter claimed in claim 1 further including, between said pressing and separation-effecting steps, the steps of curing the cast material at relatively high temperature and of thereafter at least partially cooling that material.

8. The subject matter claimed in claim 1 further including, between said separation-effecting and embossing steps, the step of color-printing the overlaid fabric.

9. The subject matter claimed in claim 1 wherein said embossing step comprises the heating of the overlay material to an almost-molten condition and the formation of said grain in that material while hot.

10. The subject matter claimed in claim 1 wherein said embossing step largely attenuates the discernibility of the pattern in the overlay corresponding to the pattern of the interstitial interspersions in the hollow of the mold.

11. The subject matter claimed in claim 1 wherein said depressions are cross-sectionally inwardly rounded, whereby the fabric becomes overlaid by a plurality of outwardly rounded interstitially separated segments.

12. The subject matter claimed in claim 1 wherein said casting step comprises spreading the thermoplastic material onto the mold and wiping away the excess of the material over approximately that which fills the marginal portions and almost fills the non-marginal portions of the depressions.

References Cited

UNITED STATES PATENTS

| | | | |
|---|---|---|---|
| 1,471,026 | 10/1923 | Gunn | 156—163 |
| 1,642,847 | 7/1927 | Emanuele | 156—163 |
| 2,817,597 | 12/1957 | Alderfer | 161—161 X |
| 2,865,046 | 12/1958 | Bird | 161—116 X |
| 3,192,294 | 6/1965 | Streed et al. | 264—293 X |
| 3,235,438 | 2/1966 | Wisotsky | 161—67 X |
| 3,285,793 | 11/1966 | Chavannes | 156—210 |

FOREIGN PATENTS 602,575  5/1948  Great Britain.

EARL M. BERGERT, *Primary Examiner.*

T. R. SAVOIE, *Assistant Examiner.*